United States Patent [19]

Valdespino

[11] 4,271,793

[45] Jun. 9, 1981

[54] INTERNAL COMBUSTION ENGINE

[76] Inventor: Joseph M. Valdespino, 5023 Golf Club Pkwy., Orlando, Fla. 32808

[21] Appl. No.: 71,776

[22] Filed: Aug. 31, 1979

[51] Int. Cl.³ .............................................. C10H 5/00
[52] U.S. Cl. ..................................... 123/3; 123/1 A; 123/DIG. 12
[58] Field of Search .................. 123/1 A, 3, DIG. 12, 123/536, 537, 538, 539, 540, 434, 41.02, 41.05, 41.1; 137/505, 505.24, 505.41, 505.42

[56] References Cited

U.S. PATENT DOCUMENTS

| 2,509,498 | 5/1950 | Heyl | 123/537 |
| 2,565,068 | 8/1951 | Drabold | 123/434 |
| 3,586,291 | 6/1971 | Malec | 137/505 |
| 4,054,423 | 10/1977 | Blenman | 123/3 |
| 4,064,890 | 12/1977 | Collins et al. | 137/505.42 |
| 4,111,160 | 9/1978 | Talenti | 123/1 A |
| 4,111,222 | 9/1978 | Hassell | 137/505.42 |
| 4,112,875 | 9/1978 | Laumann et al. | 123/1 A |

Primary Examiner—Charles J. Myhre
Assistant Examiner—R. A. Nelli
Attorney, Agent, or Firm—Duchworth, Hobby, Allen, Dyer & Pettis

[57] ABSTRACT

An improvement to an internal combustion engine having a fuel system for feeding a fuel-air mixture to the combustion chambers and an electrical generation system, such as an alternator. An electrolytic cell is attached adjacent to the engine to generate hydrogen and oxygen upon the application of a voltage between the cathode and anode of the electrolytic cell. The gas feed connects the electrolytic cell to the engine fuel system for feeding the hydrogen and oxygen to the engine combustion chambers. Improvements include placing the electrolytic cell under a predetermined pressure to prevent the electrolyte from boiling off, a cooling system for the electrolytic cell and safety features.

20 Claims, 4 Drawing Figures

INTERNAL COMBUSTION ENGINE

BACKGROUND OF THE INVENTION

1. Field of the Invention

The present invention relates to internal combustion engines and especially to improvements in internal combustion engines having electrolytic cells for generating hydrogen and oxygen for combination with the fuel-air mixture for the engine.

2. Description of the Prior Art

In the past, a variety of internal combustion engines have been provided, and typically these engines have a system for feeding a fuel, such as gasoline mixed with air, into the combustion chamber for running the engine. Such engines typically also have an electrical system which includes a generator or an alternator which may be connected through an electrical regulating circuit for charging a storage battery and for operating the electrical components of the engine and of a vehicle.

A variety of hydrogen fueled engines have also been suggested in the past, including those using combinations of hydrogen and oxygen, which in some cases are generated in the electrolytic cell having an electrolyte including solutions of salts, acids or bases in water. The electrolytic cell breaks the water down between hydrogen and oxygen through electrolysis and the hydrogen or the hydrogen and oxygen in combination can then be used to run an engine. The advantage of the hydrogen and oxygen as fuel is that it is an efficient fuel which generates no pollution, in that in the combustion the hydrogen and oxygen recombine to form water in very minute quantities. Such engines however have not been brought into general use because of the inefficiency in the generation of hydrogen and oxygen through electrolysis, which takes far more power than can be generated from the hydrogen and oxygen used as a fuel, even in high efficiency engines.

The present invention is directed toward the generation of small quantities of hydrogen and oxygen through an electrolytic cell in which hydrogen and oxygen is combined with the usual fuel-air mixture to improve the efficiency of the engine. Inasmuch as an alternator or even an auxiliary alternator attached to an engine will produce only limited quantities of fuel through electrolysis using up to several horsepower through an inefficient conversion, the value of the system lies in the improved efficiency of the engine and in the obtaining of a cleaner burn of the fuel. Tests have shown that the efficiency of the engine is improved substantially by the addition of predetermined amounts of hydrogen and oxygen in accordance with the present invention, thereby substantially increasing the miles per gallon obtained by a vehicle. The tests have also indicated a substantial improvement in emissions of carbon monoxide and particulate matter in the exhaust of an engine, indicating that such an engine can meet emission requirements.

Prior art use of electrolytic cells can be seen in U.S. Pat. No. 2,565,068 for an internal-combustion engine which suggests the use of parafin on top of the electrolyte in the electrolytic cell and a splash or shield plate to prevent the boiling off of the electrolyte. The electrolyte becomes very hot when the cell is in operation, and if connected to the manifold, a vacuum is produced thereby lowering the boiling point in the electrolyte. This problem is somewhat increased if larger currents are used to generate larger amounts of hydrogen and oxygen.

U.S. Pat. No. 4,111,160 to Talenti teaches the use of an electrolytic cell in which the oxygen is fed to the atmosphere, while the hydrogen is fed to the fuel system through a control valve and filter. U.S. Pat. No. 2,509,498 to Heyl uses an electrolytic cell connected to the carburization system in which the electrolytic cell has a filter to absorb the electrolyte which might be carried into the engine.

U.S. Pat. No. 1,905,627 to Holland shows an electrolytic cell for generating fuel for an engine, while U.S. Pat. No. 4,023,545 to Mosher has an electrolytic cell connected to an internal combustion engine and has a solenoid actuated switch connected to the ignition system, a flow control valve and a check valve placed between the cell and the intake manifold, and provides means for conducting ambient air into the electrolysis unit for agitating the electrolyte. U.S. Pat. No. 3,648,668 to Pacheo shows an electrolytic cell connected to an internal combustion engine through a throttle valve and having a pump and reservoir, while U.S. Pat. No. 3,653,364 to Bogan produces hydrogen gas through the intake manifold by passing water vapor over heated iron balls to cause oxidation of the iron balls.

U.S. Pat. No. 3,980,053 to Horvath uses an electrolytic cell equipped with a float for detecting the level of the electrolyte, while the O'Laughlin U.S. Pat. No. 3,074,390 teaches a fuel economizer having an electrolytic cell having exhaust gases fed thereinto and which feeds the gas to the intake manifold through a control vavle. In U.S. Pat. No. 3,906,913 to Rupe, hydrogen is mixed with atomized liquid fuel which is combined with a predetermined quantity of air which is delivered to the engine, while U.S. Pat. No. 3,459,953 to Hughes, et al., uses surplus electrical energy to drive an electrolysis unit.

By Bradley, four U.S. Pat. Nos. 3,939,806; 4,003,344; 4,003,345; and 4,099,489 show a fuel regenerated nonpolluting internal combustion engine which uses an electrolysis cell to decompose water to produce oxygen which is passed to the air intake of the engine carburetors, while the hydrogen is conveyed to the carburetor.

The present invention overcomes some of the problems discussed in the prior patents by preventing the boiling off and feeding of the electrolyte solution into the engine manifold, even while using larger amperages than provided in the prior art, and at the same time, adds safety features to prevent the hydrogen from igniting in the electrolytic cell and for cooling the electrolytic cell when using larger amperages.

SUMMARY OF THE INVENTION

The present invention relates to an improvement in internal combustion engines in which existing internal combustion engines, already having a fuel feed system for feeding a fuel-air mixture to combustion chambers and an electrical generating and storage system for generating and storing electrical energy to the internal combustion engine has added an electrolytic cell for producing hydrogen and oxygen, which cell has a housing, an anode and a cathode and an electrolyte. Electrical connections are provided from the electrical generation and storage system or an auxiliary alternator to the electrolytic cell for generating the hydrogen and oxygen when the internal combustion engine is running. A gas feed connects the electrolytic cell to the internal combustion engine for feeding the hydrogen and oxygen to the combustion chambers of the engine along with the fuel-air mixture from the fuel feed system. Improvements include using a valve operatively coupled to the electrolytic cell to release hydrogen and oxygen gas only upon the gas reaching a predetermined pressure; cooling the electrolytic cell with a water jacket connected to the engine cooling system and a safety switch and accumulator.

BRIEF DESCRIPTION OF THE DRAWINGS

Other objects, features and advantages of the present invention will be apparent from the written description and the drawings, in which.

DESCRIPTION OF THE PREFERRED EMBODIMENT

Figure 1:
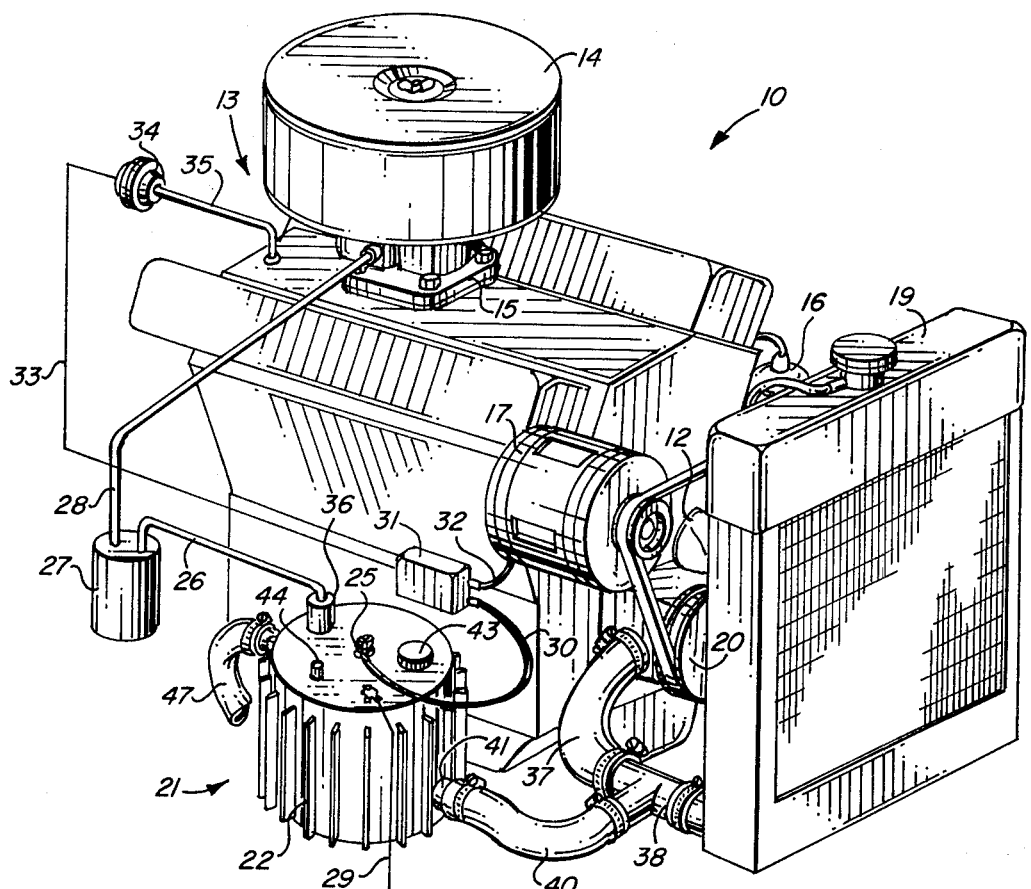
FIG. 1 is a perspective view of an engine in accordance with the present invention.

Referring to the drawings, and especially to FIG. 1, an internal combustion engine 10 has an engine block 11, a fan 12, a carburetor 13 with an air filter 14 mounted thereon, and a radiator 19. The carburetor is mounted to an intake manifold 15. The engine also has a distributor 16 and an alternator 17 connected by a fan belt 18 to a pulley 20 connected to the crankshaft of the engine. An electrolytic cell 21 may be made of stainless steel and may have fins 22 and be positioned behind the fan 12 for cooling the cell. The electrolytic cell 21 has a cathode 24 which may be the casing of the cell and is connected to the chassis at 29. The anode 25 is connected to an electrical conductor 30 which is connected to an electrical relay 31. The relay 31, in turn, is connected through a conductor 32 to the alternator 17 which in the present invention would either be a larger sized alternator than normally mounted on an engine of the same size, or might be an auxiliary or second alternator to provide the additional current found necessary to produce the preferred amount of oxygen and hydrogen from the electrolytic cell 21. An electrical conductor 33 is connected to a vacuum switch 34 which has a vacuum line 35 connected to the intake manifold of the engine 10. The electrolytic cell 21 is actuated only when the engine is running, since only then is a vacuum produced in the intake manifold for actuating the vacuum switch 34, which in turn actuates the relay which handles the higher amperage of the alternator 17. Mixed hydrogen and oxygen generated in the electrolytic cell 21 passes through a valve 36 once the pressure of the gas being generated in the cell 21 exceeds a predetermined pressure to overcome the operating mechanism of the valve 36, thereby allowing the mixed hydrogen and oxygen to pass through the line 26 into an accumulator 27. The accumulator 27 may be partially filled with water for bubbling the hydrogen and oxygen through prior to the hydrogen and oxygen being fed through a line 28 into the manifold 15 of the engine 10. The accumulator 27 advantageously prevents flashback fire from entering the electrolytic cell 21 and collects any electrolyte that might escape the electrolytic cell 21 with the gas through line 26.

A radiator hose 37 connects from the radiator 19 to the engine 10 and has a T-connection 38 therein and a water hose 40 attached thereto leading to a water jacket connection 41 in the housing of the electrolytic cell. The housing has a water jacket built therearound for cooling the electrolytic cell and the water that passes from the line 40 through the water jacket leaves the electrolytic cell through a line 42. The line 42 may be connected back into the cooling system of the engine, or, alternatively, may be connected into the heater line for the vehicle's heater, and thereby back into the cooling system of the vehicle. The connection of the cooling water directed to the heater allows a faster warm-up of the heater inasmuch as the large current used in the electrolytic cell 21 generates substantial heat very rapidly. The water from the cooling system would eventually reach a temperature which may exceed 200° F., but would still be cooling the rapidly rising temperature of the electrolyte and hold it at approximately the same temperature. The electrolytic cell 21 also has an entrance cap 43 for adding electrolyte to the electrolytic cell 21 while maintaining a complete seal under the high pressure that is generated in the cell housing. The generation of the hydrogen and oxygen which is trapped in the cell 21 will produce substantial pressure without reducing the generation of the gas so that the valve 36 can be set at 100 psi, or, preferably, between 50 and 150 psi to maintain a pressure in the cell. The pressure has several advantages, one of which prevents the boil-off of the electrolyte when the cell is connected directly onto the engine manifold. The manifold generates a vacuum or a negative pressure which substantially reduces the boiling point of the liquid which is being subjected to high temperatures and would otherwise rapidly feed-off the electrolyte to the engine. A third valve 44 is a standard pressure relief or pop-off valve which may be set at a pressure, such as 200 psi, to relieve the pressure of the electrolytic cell should the valve 36 become stopped up.

Figure 2:
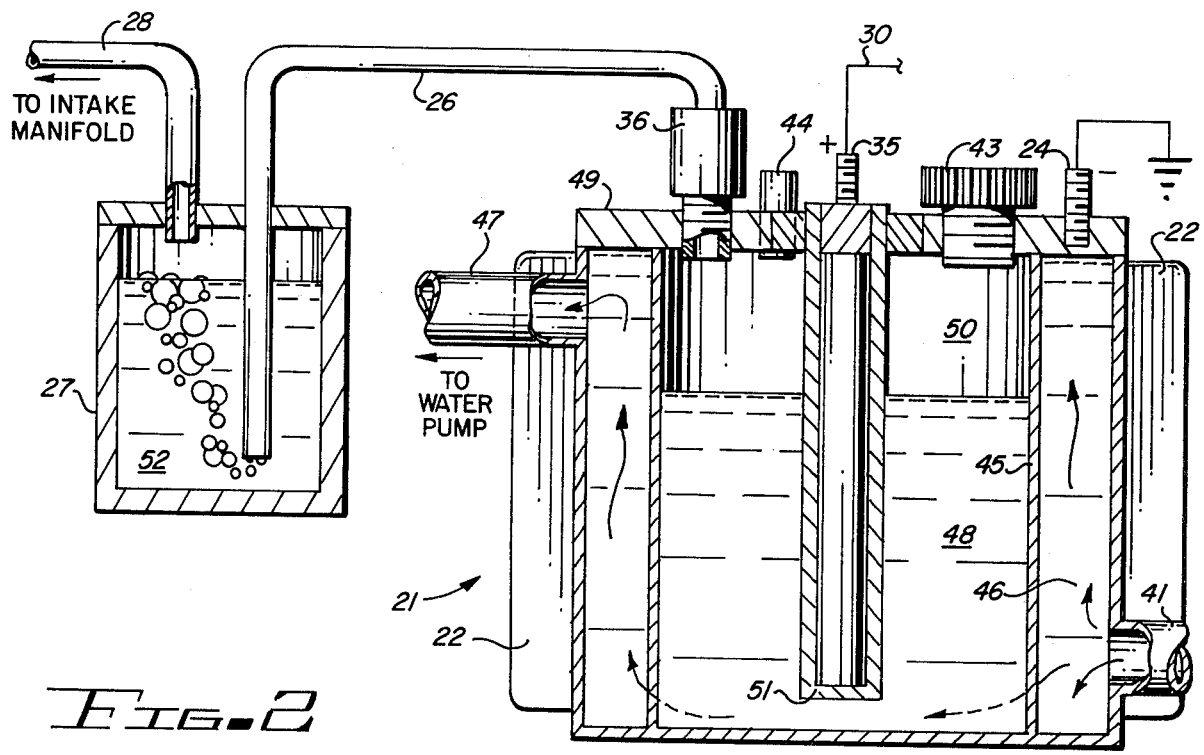
FIG. 2 is a cutaway perspective of an electrolytic cell as connected to the engine intake manifold and alternator.
Figure 3:
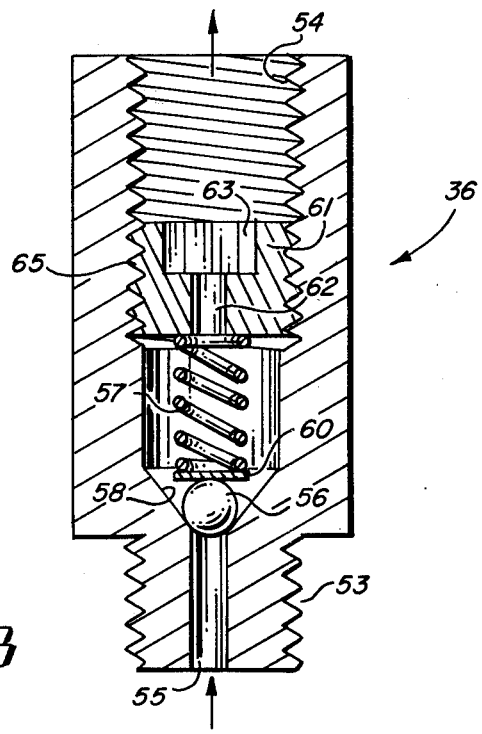
FIG. 3 is a sectional view of a pressure valve used in the embodiment of FIGS. 1 and 2.
Figure 4:
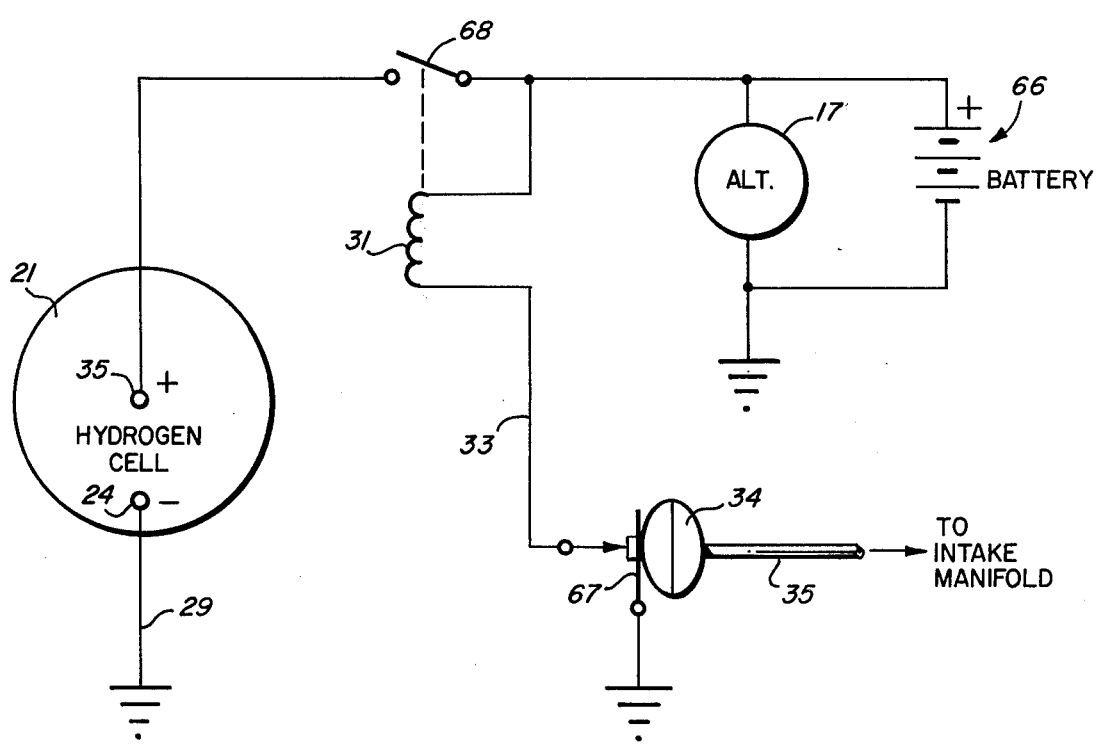
FIG. 4 is a schematic view of the electrical system for operating the electrolytic cell.

The operation of the electrolytic cell is more clearly shown in FIGS. 2, 3 and 4, in which FIG. 2 has the electrolytic cell 21 having the fins 22 and the outer housing 23, along with an inner housing 45 to form a water jacket 46 having cooling water passing therethrough from an input connection 41 to an output connection 47. The electrolyte 48 is located in chamber 50, which has the anode 35 probe 51 protruding thereinto. The anode 35 is connected to an electrical conductor 30, which is connected to the relay 31 of FIG. 1. An entrance cap 43 allows entrance into the chamber 50 and the relief valve 44 is also attached through the top 49 of the electrolytic cell 21. Pressure valve 36, which is shown in FIG. 3, is connected to the line 26 which is connected into the accumulator 27, which line protrudes well below the liquid 52, while line 28 is located well above the liquid 52 and is connected to the intake manifold of the engine 10. Liquid 52 may be water.

The pressure valve 36, as shown in FIG. 3, has external threads 53 at one end, and internal threads 54 at the other end and a passageway 55 which is connected into an opening through the electrolytic cell 21. A ball valve element 56 is biased by a spring 57 against the valve seat 58 and has a ball supporting disc 60 between the spring 57 and the ball 56. The spring is supported from the other end by a threaded element 61 having a passageway 62 therethrough and an opening 63 for an Allenhead wrench. The spring stop 61 has exterior threads 65 engaging the internal threads 54. Thus, by rotating the spring support element 61 the spring can be tightened or loosened to increase the pressure that the valve element 56 can be unseated from the valve seat 58 to allow hydrogen and oxygen gas to escape from the chamber 50 of the electrolytic cell 21 to be fed into the engine. The internal threads 54 can then also be used to connect the line 26 to the valve. It will, of course, be clear that other pressure control valves are anticipated as being within the spirit and scope of the invention. The present simple pressure control valve has been found to operate satisfactorily in the present invention. Thus, the pressure can be maintained in chamber 50 at 100 psi or at any pressure desired within a predetermined range which is controlled by threading the spring stop 61 into and out of the threads 54. However, a fairly substantial pressure, such as 100 psi is needed because of the large current and rapid heating of the electrolyte 48. The electrolyte can be any electrolyte solution desired, such as an acid, salt or alkali solution, which might typically be sulphuric acid in water, or sodium bicarbonate in water to provide strong electrolyte for more rapid production of hydrogen and oxygen. It is also possible to use distilled ionized water as the electrolyte rather than a salt or alkali solution.

In FIG. 4, the alternator 17 is shown connected across the battery 66 and through the relay 31 which is connected by line 33 to the vacuum switch 34 which is connected through a vacuum line 35 to the intake manifold. Vacuum switch 34 has a vacuum container and a switch element 67 and actuates the relay 31 to actuate the relay switch 68 which then connects the alternator to the anode 35 of the electrolytic cell 21 while the cathode is connected through line 24 to ground.

Tests to date have shown that the amount of hydrogen and oxygen needed for many engines requires a larger amperage than can be delivered by the alternator on the existing engine and thereby requires a larger alternator or an auxiliary alternator and may take several horsepower of the engine's total power. The generation of hydrogen and oxygen in an electrolytic cell is relatively inefficient, but tests to date have shown that the addition of sufficient quantities of hydrogen and oxygen produce a substantial improvement in the mileage that a gasoline powered vehicle can obtain and at the same time, produces a substantial reduction in carbon monoxide and particulate matter emissions well below that required by governmental agencies. The exhaust emissions have not been tested for nitrogen oxides, but it is believed that these may also be reduced in the present engine. It is anticipated that other embodiments of the present invention can be utilized without departing from the spirit and scope of the invention, such as having the hydrogen and oxygen separated rather than mixed and fed into the fuel system at different points. It is anticipated that hydrogen and oxygen gas can be fed through fuel injection, or even in a carbureted system, directly adjacent the spark plugs of an engine. Accordingly, the present invention is not to be construed as limited to the particular forms shown, which are to be considered illustrative rather than restrictive.

I claim:

1. An improvement to internal combustion engines comprising in combination:

an internal combustion engine having fuel feed means for feeding a fuel-air mixture to at least one combustion chamber;

an electrical generating and storage means for generating and storing electrical energy;

an electrolytic cell for generating hydrogen and oxygen therein and having a housing, an anode and a cathode and having an electrolyte in said housing;

electrical connecting means connecting said electrical generator and storage means to said electrolytic cell for generating hydrogen and oxygen when said internal combustion engine is running, and disconnecting said electrical connecting means when said engine is not running;

gas feed means connecting said electrolytic cell to said internal combustion engine fuel feed means for feeding hydrogen and oxygen to said at least one internal combustion engine combustion chamber with said fuel-air mixture being fed therein when an electrical charge is applied to said electrolytic cell; and pressure control valve means operatively coupled to said electrolytic cell to produce a predetermined pressure in said electrolytic cell housing when said electrolytic cell is connected to said electrical generator and storage means, whereby hydrogen and oxygen are fed to said combustion chamber only when the pressure in said electrolytic cell housing exceeds a predetermined pressure.

2. The apparatus in accordance with claim 1, in which said pressure control valve means has adjustment means for varying the predetermined pressure in said electrolytic cell housing when said electrolytic cell is connected to said electrical generator and storage means.

3. The apparatus in accordance with claim 2, in which said pressure control valve means includes a valve casing having a valve seat and a valve element biased against said valve seat under a predetermined bias to allow the opening of said valve element only upon a predetermined pressure being applied to said valve element through said valve seat.

4. The apparatus in accordance with claim 3, in which said valve element is biased by a spring having a threaded spring support rotatable to increase or decrease the spring pressure against the valve element, said spring support having a passageway therethrough.

5. The apparatus in accordance with claim 4, in which said spring support extends into the internal threads of said pressure control valve means casing and is formed to receive an Allen wrench for adjusting said spring seat.

6. The apparatus in accordance with claim 1, in which said electrolytic cell for generating hydrogen and oxygen has a housing having a liquid cooling jacket formed partially therearound, said liquid cooling jacket having an input and output therefrom for the passing of liquid for cooling said electrolytic cell.

7. The apparatus in accordance with claim 6, in which said liquid cooling jacket has said input connected to an engine cooling system and said output connected back to said engine cooling system, whereby liquid from said engine cooling system cools said electrolytic cell by passing through said cooling jacket.

8. The apparatus in accordance with claim 7, in which the output from said electrolytic cell cooling jacket is connected back into said liquid cooling system through a vehicle heater whereby said vehicle heater can produce heat at a more rapid rate.

9. The apparatus in accordance with claim 8, in which said electrolytic cell housing sidewall is the cathode for said electrolytic cell and said cooling jacket extends around said cathode.

10. The apparatus in accordance with claim 1, in which said electrical connecting means connecting said electrical generator and storage means to said electrolytic cell includes an electrical relay therein for connecting said electrical generator and storage means to said electrolytic cell when actuated.

11. The apparatus in accordance with claim 10, in which a vacuum actuated switch is operatively connected to the intake manifold of an engine for actuating said switch and through an electrical conductor to said relay for actuating said electrical relay when said engine intake manifold has a negative pressure therein.

12. The apparatus in accordance with claim 1, in which said gas feed means connecting said electrolytic cell to said internal combustion engine fuel feed means has an accumulator means therein having a container partially filled with a liquid and having a gas line connected from said pressure control valve means passing thereinto and into said liquid in said accumulator and a gas line connecting said accumulator above said liquid to said internal combustion engine fuel feed means whereby gas from said electrolytic cell is passed through a liquid.

13. The apparatus in accordance with claim 12, in which said accumulator is partially filled with water.

14. The internal combustion engine in accordance with claim 1, in which said electrical generating and storage means includes an alternator driven by an internal combustion engine.

15. The apparatus in accordance with claim 14, in which said alternator is an auxiliary alternator driven by said internal combustion engine.

16. An improvement to internal combustion engines comprising in combination:
an internal combustion engine having fuel feed means for feeding a fuel-air mixture to at least one combustion chamber;
an electrical generating and storage means for generating and storing electrical energy;
an electrolytic cell for generating hydrogen and oxygen therein and having a housing, an anode and a cathode and having an electrolyte in said housing;
electrical connecting means connecting said electrical generator and storage means to said electrolytic cell for generating hydrogen and oxygen when said internal combustion engine is running, and disconnecting said electrical connecting means when said engine is not running;
gas feed means connecting said electrolytic cell to said internal combustion engine fuel feed means for feeding hydrogen and oxygen to said at least one internal combustion engine combustion chamber with said fuel-air mixture being fed therein when an electrical charge is applied to said electrolytic cell; and
electrolytic cell cooling means including a liquid cooling jacket at least partially covering said housing and having an input thereto and an output therefrom, said liquid cooling jacket being connected to a circulating cooling liquid.

17. The apparatus in accordance with claim 16, in which said liquid cooling jacket input is connected to an engine liquid cooling means and said output is connected back into said engine liquid cooling system.

18. The apparatus in accordance with claim 17, including a pressure control valve means operatively coupled to an electrolytic cell to produce a predetermined pressure in said electrolytic cell housing when said electrolytic cell is connected to said electrical generator and storage means so that hydrogen and oxygen are fed to said combustion chamber only when the pressure in said electrolytic cell housing exceeds a predetermined pressure.

19. The apparatus in accordance with claim 18, in which said electrical connecting means includes a relay connected therein for connecting said generator and storage means to said electrolytic cell and includes a vacuum switch connected to the intake manifold of said engine for actuating said switch whenever a predetermined negative pressure is generated in said intake manifold, said vacuum switch being connected to said relay for actuating said relay when said engine is running.

20. The apparatus in accordance with claim 1 or 19, in which said electrolytic cell housing has a pressure relief valve mounted thereinto for relieving pressure in said cell upon said pressure exceeding the safety limit of said safety valve.

* * * * *